US009757881B2

(12) United States Patent
Tummala et al.

(10) Patent No.: US 9,757,881 B2
(45) Date of Patent: Sep. 12, 2017

(54) ADHESIVE FOR 3D PRINTING

(71) Applicant: 3D Systems, Inc., Rock Hill, SC (US)

(72) Inventors: Praveen Tummala, Rock Hill, SC (US); Peter Scott Turner, Valencia, CA (US); Martin Alan Johnson, Rock Hill, SC (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

(21) Appl. No.: 14/934,860

(22) Filed: Nov. 6, 2015

(65) Prior Publication Data

US 2016/0059445 A1    Mar. 3, 2016

Related U.S. Application Data

(63) Continuation of application No. 14/401,970, filed as application No. PCT/US2013/041633 on May 17, 2013, now abandoned.

(60) Provisional application No. 61/649,176, filed on May 18, 2012.

(51) Int. Cl.
| | | |
|---|---|---|
| *C09J 129/04* | (2006.01) | |
| *B29C 37/00* | (2006.01) | |
| *B29C 67/00* | (2017.01) | |
| *C08G 73/02* | (2006.01) | |
| *C09J 179/02* | (2006.01) | |
| *C09J 177/00* | (2006.01) | |
| *C09J 129/10* | (2006.01) | |
| *C09J 133/08* | (2006.01) | |
| *C09J 179/00* | (2006.01) | |
| *B33Y 10/00* | (2015.01) | |
| *B29K 29/00* | (2006.01) | |
| *B29K 33/04* | (2006.01) | |

(52) U.S. Cl.
CPC ...... *B29C 37/0003* (2013.01); *B29C 67/0055* (2013.01); *B29C 67/0085* (2013.01); *B29C 67/0092* (2013.01); *C08G 73/0233* (2013.01); *C09J 129/04* (2013.01); *C09J 129/10* (2013.01); *C09J 133/08* (2013.01); *C09J 177/00* (2013.01); *C09J 179/00* (2013.01); *C09J 179/02* (2013.01); *B29K 2029/04* (2013.01); *B29K 2033/04* (2013.01); *B33Y 10/00* (2014.12)

(58) Field of Classification Search
CPC ... B29C 37/0003; C09J 129/00; C09J 179/00; C09J 129/04
USPC .......................................................... 524/503
See application file for complete search history.

(56) References Cited

U.S. PATENT DOCUMENTS

| | | | |
|---|---|---|---|
| 2,677,672 A * | 5/1954 | Luce ..................... | C09J 131/04 524/112 |
| 4,436,867 A | 3/1984 | Pomplun | |
| 4,749,347 A | 6/1988 | Valavaara | |
| 4,849,468 A | 7/1989 | Murachi et al. | |
| 5,121,329 A | 6/1992 | Crump | |
| 5,939,008 A | 8/1999 | Comb et al. | |
| 6,103,809 A | 8/2000 | Ahmed et al. | |
| 6,193,923 B1 | 2/2001 | Leyden et al. | |
| 6,217,432 B1 | 4/2001 | Woo | |
| 6,558,606 B1 | 5/2003 | Kulkarni et al. | |
| 6,824,639 B1 | 11/2004 | Hill et al. | |
| 7,958,841 B2 | 6/2011 | Kritchman et al. | |
| 8,287,794 B2 | 10/2012 | Pax et al. | |
| 8,425,218 B2 | 4/2013 | Pettis | |
| 2002/0111707 A1 | 8/2002 | Li et al. | |
| 2003/0091811 A1 | 5/2003 | Skrzyniarz et al. | |
| 2004/0056378 A1* | 3/2004 | Bredt .................. | B29C 67/0081 264/109 |
| 2005/0197431 A1 | 9/2005 | Bredt et al. | |
| 2007/0241482 A1* | 10/2007 | Giller .................. | B29C 67/0066 264/494 |
| 2008/0118655 A1 | 5/2008 | Kritchman | |
| 2008/0233302 A1 | 9/2008 | Elsner et al. | |
| 2011/0060445 A1 | 3/2011 | Heenan | |
| 2011/0156301 A1* | 6/2011 | Giller .................. | B29C 67/0081 264/128 |
| 2012/0121897 A1 | 5/2012 | Kim et al. | |

FOREIGN PATENT DOCUMENTS

| | | |
|---|---|---|
| EP | 94116244.8 | 5/1995 |
| EP | 03075228.1 | 7/2003 |
| EP | 003075228.1 | 7/2003 |
| WO | 99/60508 | 11/1999 |
| WO | 9960508 A1 | 11/1999 |
| WO | 2004/045834 | 6/2004 |
| WO | 2004045834 A1 | 6/2004 |
| WO | 2011025153 | 3/2011 |

OTHER PUBLICATIONS

International Search Report and Written Opinion for PCT/US2013/041633, mailed Jul. 26, 2013, 7 pages.
International Search Report for International Application No. PCT/US2013/041620, dated Sep. 5, 2013, 5 pages.
PCT Written Opinion of the International Search Authority for International Application No. PCT/US2013/041620, dated Sep. 5, 2013, 6 pages.
PCT International Preliminary Report for International Application No. PCT/US2013/041633, dated Nov. 27, 2014, 2 pages.
PCT International Search Report for International Application No. PCT/US2013/041633, dated Jul. 26, 2013 (4 pages).
PCT Written Opinion of the International Search Authority for International Application No. PCT/US2013/041633, dated Jul. 26, 2013 (5 pages).

(Continued)

Primary Examiner — Deve E Valdez

(57) ABSTRACT

In one aspect, adhesives for use with a 3D printer are described herein. In some embodiments, an adhesive for use with a 3D printer comprises a first polymeric component comprising a poly(vinyl alcohol) and a second polymeric component. The poly(vinyl alcohol), in some embodiments, comprises amorphous poly(vinyl alcohol). In some embodiments, the second polymeric component comprises a water-soluble polymer. Further, in some embodiments, an adhesive described herein further comprises a solvent, a surfactant, and/or a preservative.

20 Claims, 2 Drawing Sheets

(56) References Cited

OTHER PUBLICATIONS

PCT International Search Report for International Application No. PCT/US2013/041620, dated Sep. 5, 2013 (5 pages).
PCT Written Opinion of the International Search Authority for International Application No. PCT/US2013/041620 dated Sep. 5, 2013 (6 pages).
PCT International Preliminary Report for International Application No. PCT/US2013/041633, dated Nov. 27, 2014 (2 pages).
PCT Written Opinion for International Application No. PCT/US2013/041633, dated Nov. 27, 2014 (5 pages).

* cited by examiner

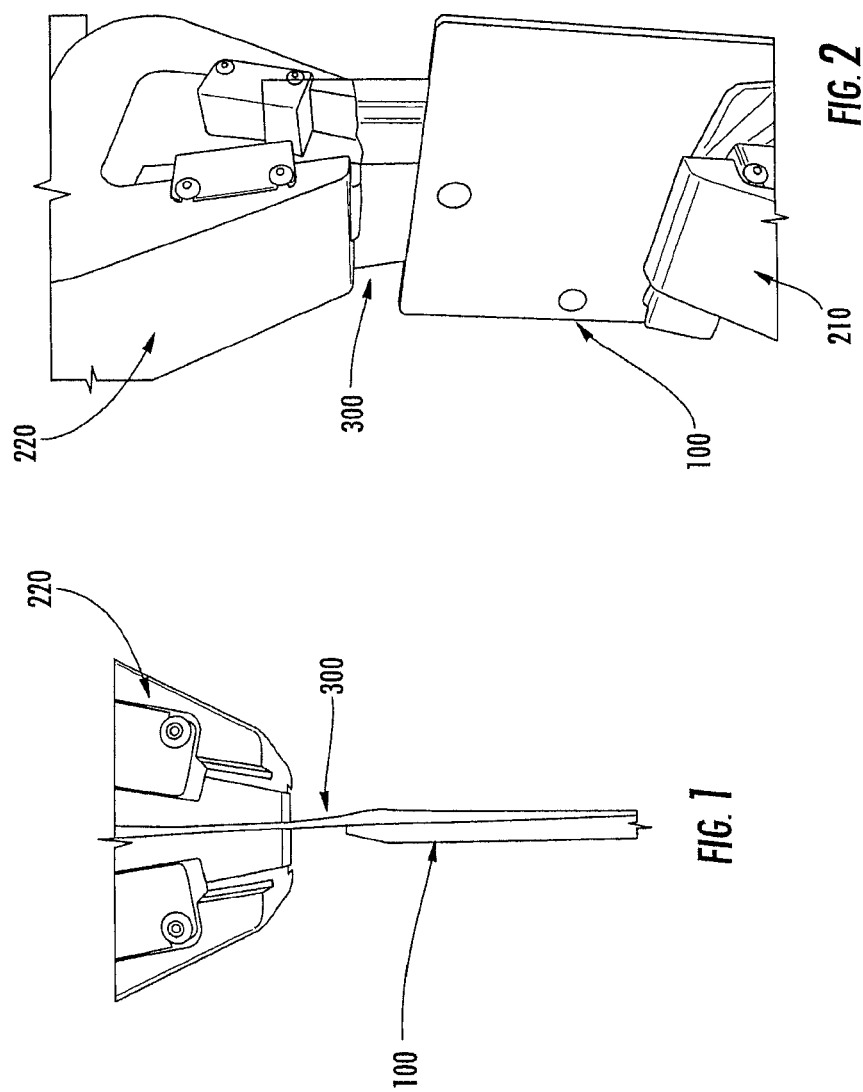

ADHESIVE FOR 3D PRINTING

CROSS REFERENCE TO RELATED APPLICATION

This application is a continuation of co-pending U.S. patent application Ser. No. 14/401,970, filed Nov. 18, 2014, which is a U.S. national phase of PCT Application No. PCT/US2013/041633, filed May 17, 2013, which claims priority pursuant to 35 U.S.C. §119(e) to U.S. Provisional Patent Application Ser. No. 61/649,176, filed on May 18, 2012, each incorporated by reference in its entirety.

FIELD

The present invention relates to adhesives and, in particular, to adhesives for use with three dimensional (3D) printing systems.

BACKGROUND

Additive and subtractive manufacturing technologies enable computer designs, such as CAD files, to be made into three dimensional (3D) objects. 3D printing, also known as additive manufacturing, typically comprises depositing, curing, fusing, or otherwise forming a material into sequential cross-sectional layers of the 3D object. For example, fused deposition modeling techniques, which are generally disclosed in U.S. Pat. No. 4,749,347 and U.S. Pat. No. 5,121,329, among others, include melting a filament of build material or print material and extruding the print material out of a dispenser that is moved in the x-, y-, and z-axes relative to a print pad. The print material is generally deposited in layers in the x- and y-axes to form cross-sectional layers that are stacked along the z-axis to form the 3D object.

Commercially available three dimensional printers, such as the Cube® 3D Printer manufactured by 3D Systems of Rock Hill, S.C., use a print material or ink that is jetted or extruded through a print head as a liquid to form various printed parts. In some instances, the print material is deposited onto a print pad (or onto a "raft" of support material disposed on the print pad), which can result in the formation of a bond between the extruded print material and the surface of the print pad (or between the surface of the raft and the surface of the print pad). However, after the print process is complete, the bond is generally broken and the printed part is removed from the print pad.

A weak bond between the extruded print material (or the support material, if a raft is used) and the surface of the print pad can cause the extruded print material to separate from the print pad prematurely. Such separation can lead to a failed print process and/or to imperfections in the printed 3D object. In contrast, a strong bond can prevent the extruded print material from separating from the print pad prematurely but may also make it difficult to remove the printed 3D object and any support material from the print pad following completion of the print process. Further, this difficulty can require a user to employ a hand tool such as a scraper to separate the printed 3D object from the print pad, which can lead to damage to the printed 3D object and/or the surface of the print pad.

In addition, because print pads are often reusable, it can be desirable to remove all of the extruded print material or support material of a previous print process prior to beginning a new print process. In some instances, such removal can be tedious and time consuming as well as damaging to the print pad. Therefore, a need exists to improve the printing of 3D objects to provide accurate parts, models, and other 3D objects that are easily and safely removed from the print pad.

SUMMARY

The various embodiments of the present invention address the above needs and achieve other advantages by providing an adhesive that provides satisfactory bonding of the extruded print material (or support material) to the print pad during the print process yet enables the printed material to be easily separated from the print pad after the print process. Such use of an adhesive in 3D printing is not previously known. Thus, some embodiments of the present invention may be used to allow printing of accurate 3D objects with surfaces that are easily separated from both the print pad and from the support structures in a manner not previously achieved. Some embodiments of the present invention may be particularly advantageous with 3D printing techniques that use the same print material to print the 3D object and the support structure. However, some embodiments of the present invention may also be used with 3D printing techniques that use different materials to print the 3D object and the support structure.

In one aspect, adhesives for use with a 3D printer are described herein which, in some embodiments, may provide one or more advantages compared to prior adhesives. For example, in some embodiments, an adhesive described herein can provide a bond between a print material (or a raft) and a print pad having a desired adhesive strength. In addition, in some embodiments, an adhesive described herein is operable to selectively bond or release a print material to or from a print pad. In some embodiments, for instance, the adhesive properties of an adhesive described herein are temperature-dependent. In some embodiments, the adhesive properties are water-sensitive.

An adhesive for use with a 3D printer described herein, in some embodiments, comprises a first polymeric component comprising a poly(vinyl alcohol) and a second polymeric component. The first polymeric component and the second component are not the same material but are instead separate components of the adhesive. The poly(vinyl alcohol), in some embodiments, comprises amorphous poly(vinyl alcohol). In some embodiments, the second polymeric component comprises a water-soluble polymer such as a poly(2-ethyl-2-oxazoline). Further, in some embodiments, an adhesive described herein further comprises a solvent, a surfactant, and/or a preservative.

In another aspect, methods of printing a 3D article or object are described herein. In some embodiments, a method of printing a 3D article comprises applying an adhesive to a build surface of a print pad of a 3D printer, the adhesive comprising a first polymeric component comprising a poly(vinyl alcohol) and a second polymeric component. The first polymeric component and the second component are not the same material but are instead separate components of the adhesive. The method further comprises selectively depositing layers of a fluid ink or print material onto the surface of the print pad to form the 3D article. In some embodiments, the method further comprises removing the 3D article from the print pad. Moreover, in some embodiments, removing the 3D article from the print pad comprises altering the adhesive property of the adhesive.

These and other embodiments are described in greater detail in the detailed description which follows.

BRIEF DESCRIPTION OF THE DRAWINGS

FIG. 1 illustrates a side view of an experimental setup used to measure the adhesive properties of an adhesive according to one embodiment described herein.

FIG. 2 illustrates a perspective view of the experimental setup of FIG. 1.

DETAILED DESCRIPTION

Figure 3:
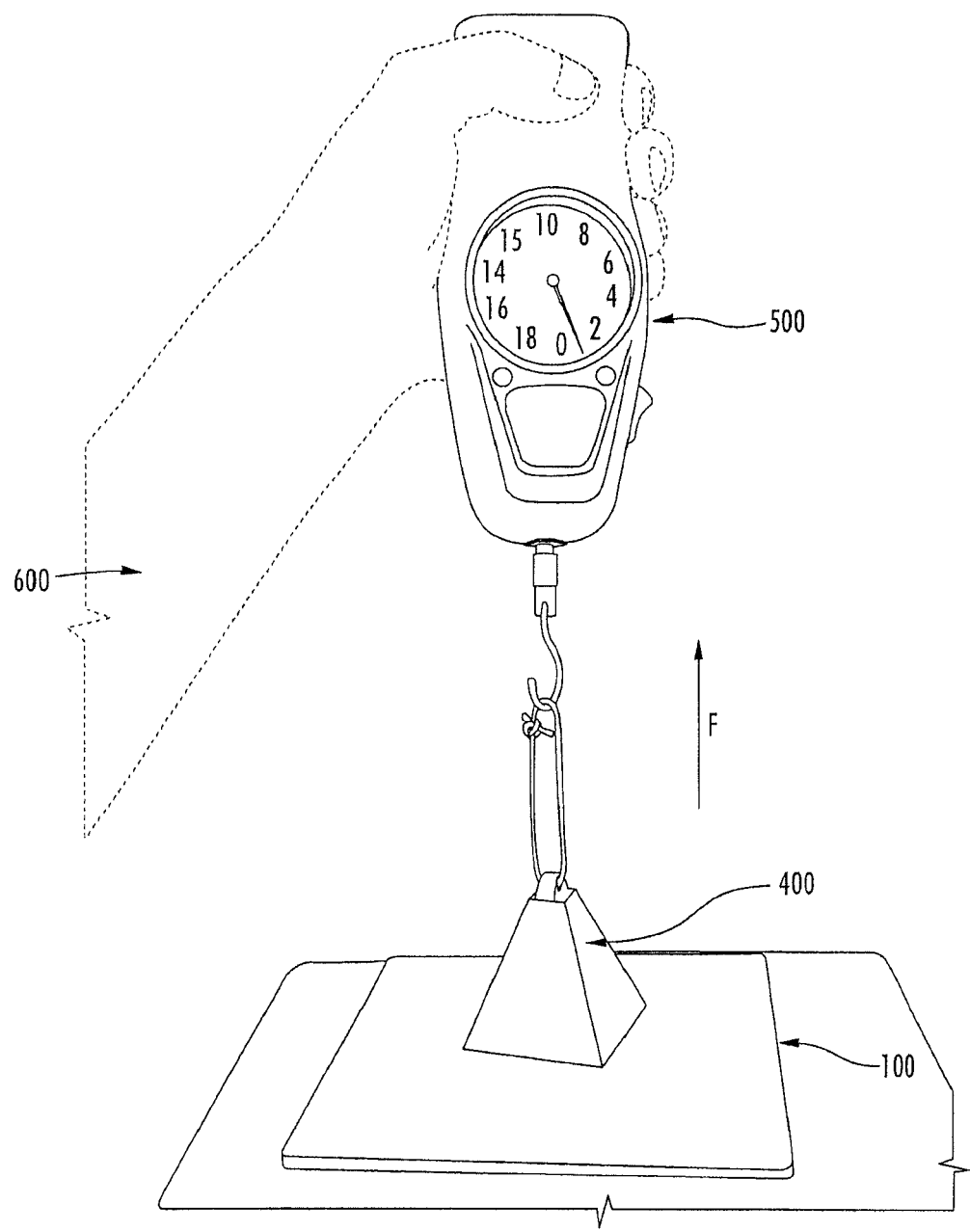
FIG. 3 illustrates a perspective view of an experimental setup used to measure the adhesion or bonding strength of an adhesive according to one embodiment described herein.

Embodiments described herein can be understood more readily by reference to the following detailed description, examples, and drawings. Elements, apparatus and methods described herein, however, are not limited to the specific embodiments presented in the detailed description, examples, and drawings. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three dimensional printing system," "three dimensional printer," "printing," and the like generally describe various solid freeform fabrication techniques for making three dimensional (3D) articles or objects by selective deposition, jetting, fused deposition modeling, and other techniques now known in the art or that may be known in the future that use a build material or print material to fabricate the three dimensional object.

As understood by one of ordinary skill in the art and as described further herein, 3D printing can include selectively depositing layers of a fluid build or print material to form a 3D article on a substrate such as a print pad. Any print pad not inconsistent with the objectives of the present invention may be used. In some embodiments, for instance, a print pad comprises an anodized aluminum print surface. In other embodiments, a print pad comprises a glass print surface such as a clear soda lime float glass surface or a polymeric print surface such as a polycarbonate print surface. Further, a print pad described herein can have a smooth surface or a textured surface. For example, in some embodiments, a glass print pad described herein has a "Course Grind" finish on the build surface of the print pad, where the "build surface" comprises the surface of the print pad on which building or printing occurs.

In general, a fluid print material can be deposited onto a print pad through a dispenser, which may be a heated nozzle through which a filament print material is fed to generally melt the filament print material and dispense the print material from the exit of the dispenser. Any print material not inconsistent with the objectives of the present invention may be used. In some embodiments, the print material comprises an organic composition such as organic polymeric composition. For example, in some embodiments, a print material comprises a polylactic acid (PLA) or acrylonitrile butadiene styrene (ABS) polymer. Other polymers may also be used as a print material.

Moreover, in some embodiments, production of a 3D object in a 3D printing system also includes the use of a support material in conjunction with the print material. The support material can be used to support at least one layer of the print material and can be used to form a variety of support structures, such as one or more fine points or a "raft." A raft, in some embodiments, can be essentially planar and can form a lower portion of a support structure in contact with the print pad, such that the raft is disposed between the print pad and the print material of the 3D article. Like the print material, the support material can be jetted through a print head or other dispenser as a liquid. In some embodiments, the support material can consist of hydrophobic chemical species solid at ambient temperatures and liquid at the elevated jetting temperatures. However, unlike the print material, the support material is subsequently removed to provide the finished three-dimensional part. In some embodiments, the support material comprises the same material or has the same chemical composition as the print material. In other instances, the support material has a different chemical composition than the print material.

Additionally, the print material and/or support material, in some embodiments, can be selectively deposited according to an image of the 3D article, the image being in a computer readable format.

I. Adhesives

In one aspect, adhesives for use with a 3D printer are described herein. More specifically, adhesives for use with a print pad of a 3D printer are described herein. An "adhesive," in some embodiments, comprises a material that is operable to bond a print material or a raft to a print pad, including one or more print materials, rafts, and/or print pads described herein, such as PLA or ABS print materials and metal, glass, or plastic print pads. Moreover, in some embodiments, an adhesive is operable to selectively bond or release a print material or raft to or from a print pad. For example, in some embodiments, the adhesive properties of an adhesive described herein are temperature-dependent. In some embodiments, the adhesive properties are water-sensitive. As described herein, an adhesive can be applied to a print pad prior to beginning of a printing process. Such application of an adhesive to a print pad of a 3D printer as described herein has not previously been known in the art.

In some embodiments, an adhesive described herein comprises a first polymeric component comprising a poly(vinyl alcohol) (hereinafter "PVOH") and a second polymeric component. The first polymeric component and the second component are not the same material but are instead separate components of the adhesive. In some embodiments, an adhesive further comprises one or more of a solvent, a surfactant, and a preservative. Alternatively, in other embodiments, the first polymeric component of an adhesive described herein does not necessarily comprise a PVOH. Moreover, in some embodiments wherein the first polymeric component does not necessarily comprise a PVOH, the first polymeric component and the second polymeric component are the same. In other embodiments, the first polymeric component and the second polymeric component are different and are separate components of the adhesive.

Turning now to components of adhesives, adhesives described herein, in some embodiments, comprise a first polymeric component comprising a PVOH. Any PVOH not inconsistent with the objectives of the present invention may be used. In some embodiments, a PVOH comprises amorphous PVOH, including highly amorphous PVOH. In some embodiments, a PVOH comprises crystalline PVOH.

A PVOH can have any molecular weight or molar mass not inconsistent with the objectives of the present invention. In some embodiments, a PVOH has a weight average molecular weight or molar mass between about 5,000 and about 50,000 g/mol. In some embodiments, a PVOH has a weight average molecular weight between about 5,000 and about 20,000, between about 5,000 and about 15,000, or between about 10,000 and about 15,000.

In addition, a PVOH can be present in an adhesive described herein in any amount not inconsistent with the objectives of the present invention. In some embodiments, a PVOH is present in the adhesive in an amount between about 1 and about 50 weight percent, between about 2 and about 50 weight percent, between about 3 and about 50 weight percent, or between about 5 and about 50 weight percent, based on the total weight of the adhesive. In some embodiments, a PVOH is present in an amount between about 1 and about 20 weight percent, between about 1 and about 10 weight percent, between about 3 and about 20 weight percent, or between about 3 and about 10 weight percent, based on the total weight of the adhesive. In some embodiments, a PVOH is present in an amount between about 20 and about 40 weight percent or between about 25 and about 35 weight percent, based on the total weight of the adhesive.

In some embodiments, a first polymeric component of an adhesive described herein does not necessarily comprise a PVOH. In some embodiments wherein a first polymeric component does not necessarily comprise a PVOH, the first polymeric component comprises one or more of a methyl vinyl ether/maleic anhydride co-polymer, a poly(2-oxazoline), poly(2-ethyl-2-oxazoline), poly(2-ethyl-oxazoline), polyvinylpyrrolidone, polyvinyl acetate, ethylene vinyl alcohol, ethylene vinyl acetate, polymethyl acrylate, polylactic acid, a starch based polymer, a cellulose based polymer, polycaprolactone, a polyhydroxyalkanoate such as polyhydroxybutyrate and/or polyhydroxybutyrate co-hydroxyalkanoate, polyimide, polyesteramide, an aliphatic copolyester, aromatic copolyester, poly(vinyl alcohol), and mixtures or blends thereof.

Adhesives described herein, in some embodiments, also comprise a second polymeric component. Any second polymeric component not inconsistent with the objectives of the present invention may be used. In some embodiments, a second polymeric component comprises a water-soluble polymer such as an ionic polymer, a polar polymer, or a hydrophilic polymer. A water-soluble polymer, for reference purposes herein, has a solubility in water at 25° C. of greater than 10 mass percent, greater than 30 mass percent, greater than 50 mass percent, or greater than 90 mass percent, based on the mass of the polymer.

In some embodiments, a second polymeric component comprises an extrudable polymer. An extrudable polymer, for reference purposes herein, comprises a polymer that can be extruded by a plastic extrusion process. In some embodiments, a second polymeric component comprises a polymer that is both water-soluble and extrudable.

In some embodiments, a second polymeric component comprises one or more of a methyl vinyl ether/maleic anhydride co-polymer, a poly(2-oxazoline), poly(2-ethyl-2-oxazoline), poly(2-ethyl-oxazoline), polyvinylpyrrolidone, polyvinyl acetate, ethylene vinyl alcohol, ethylene vinyl acetate, polymethyl acrylate, polylactic acid, a starch based polymer, a cellulose based polymer, polycaprolactone, a polyhydroxyalkanoate such as polyhydroxybutyrate and/or polyhydroxybutyrate co-hydroxyalkanoate, polyimide, polyesteramide, an aliphatic copolyester, aromatic copolyester, poly(vinyl alcohol), and mixtures or blends thereof. In some embodiments, a polymer of the second polymeric component does not comprise PVOH. Moreover, in some embodiments wherein a first polymeric component of an adhesive described herein does not comprise PVOH, the second polymeric component also does not comprise PVOH.

A second polymeric component described herein can have any molecular weight or molar mass not inconsistent with the objectives of the present invention. In some embodiments, a second polymeric component has a weight average molecular weight or molar mass between about 5,000 and about 500,000. In some embodiments, a second polymeric component has a weight average molecular weight between about 10,000 and about 100,000 or between about 20,000 and about 70,000.

A second polymeric component can be present in an adhesive described herein in any amount not inconsistent with the objectives of the present invention. In some embodiments, a second polymeric component is present in an adhesive in an amount between about 1 and about 50 weight percent, between about 2 and about 50 weight percent, between about 3 and about 50 weight percent, or between about 5 and about 50 weight percent, based on the total weight of the adhesive. In some embodiments, a second polymeric component is present is an amount between about 10 and about 20 weight percent or between about 5 and about 15 weight percent, based on the total weight of the adhesive. In some embodiments, a second polymeric component is present is an amount between about 15 and about 50 weight percent or between about 30 and about 50 weight percent, based on the total weight of the adhesive.

Further, in some embodiments, an adhesive described herein comprises only one polymeric component. Such a single polymeric component, in some embodiments, can comprise, consist, or consist essentially of any of the polymeric species described herein for a first or second polymeric component of an adhesive. For example, in some embodiments, a single polymeric component comprises, consists, or consists essentially of a methyl vinyl ether/maleic anhydride co-polymer, a poly(2-oxazoline), poly(2-ethyl-2-oxazoline), poly(2-ethyl-oxazoline), polyvinylpyrrolidone, polyvinyl acetate, ethylene vinyl alcohol, ethylene vinyl acetate, polymethyl acrylate, polylactic acid, a starch based polymer, a cellulose based polymer, polycaprolactone, a polyhydroxyalkanoate such as polyhydroxybutyrate and/or polyhydroxybutyrate co-hydroxyalkanoate, polyimide, polyesteramide, an aliphatic copolyester, aromatic copolyester, or PVOH.

Such a single polymeric component can be present in an adhesive described herein in any amount not inconsistent with the objectives of the present invention. In some embodiments, a single polymeric component is present in an adhesive in an amount between about 5 and about 80 weight percent or between about 5 and about 60 weight percent, based on the total weight of the adhesive. In some embodiments, a single polymeric component is present is an amount between about 20 and about 80 weight percent, between about 20 and about 60 weight percent, or between about 40 and about 70 weight percent, based on the total weight of the adhesive.

Adhesives described herein, in some embodiments, also comprise a solvent. Any solvent not inconsistent with the objectives of the present invention may be used. In some embodiments, a solvent comprises water, including distilled water or deionized (DI) water. In some embodiments, a solvent comprises one or more of acetone, ethanol, methanol, ethylene glycol, propylene glycol, triethylene glycol, glycerin, acetamide, dimethyl acetamide, dimethyl sulfoxide, methyl ethyl ketone, methylene chloride, and combinations or mixtures thereof.

A solvent can be present in an adhesive described herein in any amount not inconsistent with the objectives of the present invention. In some embodiments, a solvent is present in the adhesive in an amount greater than about 50 weight percent, based on the total weight of the adhesive. In some embodiments, a solvent is present in an amount between about 50 and about 95 weight percent, based on the total weight of the adhesive. In some embodiments, a solvent is present in an amount between about 55 and about 75 weight percent or between about 60 and about 70 weight percent, based on the total weight of the adhesive.

Adhesives described herein, in some embodiments, further comprise a surfactant. Any surfactant not inconsistent with the objectives of the present invention may be used. In some embodiments, for instance, a surfactant comprises a non-ionic surfactant. In some embodiments, a surfactant comprises a polyol such as a diol. In some embodiments, a surfactant comprises an alkoxylated diol. In some embodiments, a surfactant comprises a cationic, anionic, or zwitterionic surfactant. For example, in some embodiments, a surfactant comprises a quaternary ammonium compound or quaternary ammonium salt such as cetyltrimethylammonium bromide. Other non-limiting examples of surfactants suitable for use in some embodiments described herein include SURFYNOL and/or DYNOL surfactants (both available from Air Products), including SURFYNOL 104, SURFYNOL 440, SURFYNOL 2502, and DYNOL 604.

A surfactant can have any molar mass or molecular weight not inconsistent with the objectives of the present invention. In some embodiments, a surfactant has a molecular weight between about 100 and about 10,000. In some embodiments, a surfactant has a molecular weight between about 1000 and about 10,000 or between about 5000 and about 10,000. In some embodiments, a surfactant has a molecular weight between about 100 and about 500 or between about 500 and about 1000. In some embodiments, a surfactant has a weight average molecular weight between about 100 and about 50,000.

A surfactant can be present in an adhesive described herein in any amount not inconsistent with the objectives of the present invention. In some embodiments, a surfactant is present in an adhesive in an amount between about 0.01 and about 1 weight percent, based on the total weight of the adhesive. In some embodiments, a surfactant is present is an amount between about 0.01 and about 0.1 weight percent or between about 0.01 and about 0.05, based on the total weight of the adhesive.

Adhesives described herein, in some embodiments, further comprise a preservative. Any preservative not inconsistent with the objectives of the present invention may be used. In some embodiments, for instance, a preservative comprises a biocide. In some embodiments, a preservative comprises an inorganic composition, including metals and/or metal salts. In some embodiments, for example, a preservative comprises metallic copper, zinc, or silver or a salt of copper, zinc, or silver. In some embodiments, a preservative comprises an alkali or alkaline earth metal or salt thereof. In some embodiments, a preservative comprises a nitrate or a nitrite, including a nitrate or a nitrite of an alkali or alkaline earth species. In some embodiments, a preservative comprises an aqueous solution.

A preservative can be present in an adhesive described herein in any amount not inconsistent with the objectives of the present invention. In some embodiments, a preservative is present in an adhesive in an amount between about 0.01 and about 1 weight percent, based on the total weight of the adhesive. In some embodiments, a preservative is present is an amount between about 0.01 and about 0.1 weight percent or between about 0.01 and about 0.05 weight percent, based on the total weight of the adhesive.

Adhesives described herein, in some embodiments, can exhibit one or more desirable properties. In some embodiments, an adhesive exhibits good adhesion to a print material, support material, printed part and/or a print pad, including a print material, support material, printed part, and/or a print pad described herein. In some embodiments, an adhesive exhibits good adhesion to both a print material/support material/printed part and a print pad simultaneously, providing bonding of the print material/support material/printed part to the print pad. Moreover, in some embodiments, an adhesive described herein is capable of bonding or adhering to a print pad such as an anodized aluminum print pad even if the print pad has been worn or damaged. For example, in some embodiments, an adhesive described herein can bond or adhere to a print pad that has lost some or all of its anodized coating. In some embodiments, an adhesive described herein can bond or adhere to a glass print pad, including a textured glass print pad. In some embodiments, an adhesive described herein can bond or adhere to a polymer print pad such as a polycarbonate print pad. Further, in some embodiments, an adhesive is capable of bonding or adhering to a print material and/or print pad without the use of a raft.

Some improved adhesion properties of an adhesive according to some embodiments described herein were demonstrated by a 180 degree peel adhesion test as follows. The surface used for the peel adhesion test was an anodized aluminum print pad described herein having a 150 mm×150 mm build surface. The tape used for the peel adhesion test was a polyester tape equipped with silicone glue (3M 8992 tape) and having a width of 100 mm and a thickness of 0.1 mm. FIGS. 1 and 2 illustrate the setup of the 180 degree peel adhesion test. FIG. 1 illustrates a side view of the setup. FIG. 2 illustrates a perspective view of the setup. As illustrated in FIGS. 1 and 2, the print pad (100) was fixed in the bottom fixture (210) and the tape (300) was fixed in the top fixture (220) on a MTS tensile tester (not shown) in tensile testing mode. The test was performed by pulling the tape (300) at a speed of 0.5 inches/min. The maximum load required to peel the tape (300) from the build surface of the print pad (100) was recorded.

In one embodiment comprising an anodized aluminum print pad, the tape was first adhered to the bare surface of the print pad. In this case, the maximum load required to peel the tape was measured to be 8 Newton or 1.8 lb-f. Second, a single coat of an adhesive described herein was applied to a 100 mm×100 mm area of the print pad surface using an applicator with a sponge tip, providing a coating thickness of 0.05-0.1 mm. Following application of the adhesive, the adhesive was allowed to dry and then the tape was adhered on top of the adhesive. The 180 degree peel test was then performed again. In this case, the maximum load required to peel the tape was measured to be 17 Newtons or 3.8 lb-f. In both cases, the failure interface was the interface between the silicone glue on the back of the tape and the bare print pad or the adhesive applied to the print pad. This test demonstrated that an adhesive described herein provides much better adhesion to a print material than the bare print pad surface. Despite using a tape equipped with a silicone glue, which is relatively inert, the adhesion of the tape to the print pad almost doubled when an adhesive described herein was used.

In addition, an adhesive described herein, in some embodiments, has adhesive properties that are tunable or selectable, so that the adhesive can act as both a bonding agent and a releasing agent. A bonding agent, in some embodiments, comprises a material that is operable to bond a print material or printed part to a print pad. A releasing agent, in some embodiments, comprises a material that facilitates release or separation of a print material or printed part from a print pad. In some embodiments, the adhesion or bonding strength of an adhesive to a print material and/or print pad is tunable such that the adhesive can serve as a bonding agent during the print process but a release agent after the print process. For example, in some embodiments, an adhesive described herein has an adhesion or bonding strength that is temperature-dependent and/or water-sensitive. In some embodiments, an adhesive has an adhesion or bonding strength described in Table I hereinbelow. The adhesion or bonding strengths of Table I refer to the force needed to separate a pyramid-shaped printed part having a footprint of either 2 inches by 2 inches or 3 inches by 3 inches from the print pad at the stated temperature, with or without a raft. The labels "Dry" and "Wet" refer to whether or not the print pad and part were submerged in water. For entries in Table I below having an adhesion or bonding strength greater than 20 pounds, the parts broke before the parts separated from the print pad. FIG. 3 illustrates an experimental setup for the adhesion or bonding strength testing. As illustrated in FIG. 3, a printed part (400) is adhered or bonded to a print pad (100) using an adhesive described herein (not shown). A force gauge (500) is used to measure the force applied by a user (600) in direction (F) needed to separate the printed part (400) from the print pad (100). As understood by one of ordinary skill in the art, however, other experimental setups could also be used.

TABLE I

| Footprint | Raft | Print Pad | 100° C. (Dry) | 23° C. (Dry) | 23° C. (Wet) |
|---|---|---|---|---|---|
| 2 × 2 | raft | anodized aluminum | >20 lbs | 0-0.5 lbs | 0-0.5 lbs |
| 2 × 2 | no raft | anodized aluminum | >20 lbs | >20 lbs | 0-0.5 lbs |
| 2 × 2 | no raft | Course Grind textured glass | — | >20 lbs | 0-0.5 lbs |
| 3 × 3 | raft | anodized aluminum | >20 lbs | >20 lbs | 0-0.5 lbs |
| 3 × 3 | no raft | anodized aluminum | >20 lbs | 19 lbs | 0-0.5 lbs |

In some embodiments, an adhesive described herein has a bonding strength that is at least about 10 times greater at 100° C. than at room temperature (about 23° C.). In some embodiments, the bonding strength is at least about 15 times greater or at least about 20 times greater at 100° C. than at room temperature. In some embodiments, an adhesive has a bonding strength about 10-50 times greater at 100° C. than at room temperature. In some embodiments, an adhesive has a bonding strength about 2-10 times greater at 100° C. than at room temperature.

In addition, in some embodiments, an adhesive described herein has a bonding strength that is at least about 10 times greater when dry at 23° C. than when wet at 23° C., where the terms "dry" and "wet" are as described above. In some embodiments, the bonding strength is at least about 15 times greater or at least about 20 times greater when dry at 23° C. than when wet at 23° C. In some embodiments, an adhesive has a bonding strength about 10-50 times greater when dry at 23° C. than when wet at 23° C. In some embodiments, an adhesive has a bonding strength about 2-10 times greater when dry at 23° C. than when wet at 23° C.

Moreover, in some embodiments, an adhesive described herein has a glass transition temperature below the temperature encountered during the print process. For example, in some embodiments, an adhesive has a glass transition temperature below about 120° C. or below about 100° C. In some embodiments, an adhesive has a glass transition temperature between about 50° C. and about 90° C. or between about 60° C. and about 80° C. In some embodiments, a film of an adhesive described herein has a rubbery consistency above its glass transition temperature, providing tackiness throughout the print process, even upon evaporation of any solvent such as water present in the adhesive. In some embodiments, an adhesive has increased tackiness above its glass transition temperature. In some embodiments, an adhesive has reduced tackiness or a hard or glassy consistency below its glass transition temperature, permitting the adhesive to act as a releasing agent.

Adhesives having adhesive properties described herein, in some embodiments, permit adhesion of a print material or printed part to a print pad throughout the print process until the part is complete. In some embodiments, use of an adhesive described herein prevents distortion or curling of the bottom of a part. Further, in some embodiments, use of an adhesive described herein permits print materials and/or printed parts to be removed or peeled from the print pad easily, without breaking, and/or without the use of tools.

Further, in some embodiments, an adhesive described herein has a high thermal or heat resistance. In some embodiments, an adhesive has a decomposition temperature greater than the temperature encountered by the adhesive during the print process. In some embodiments, an adhesive has a decomposition temperature greater than about 150° C. or greater than about 200° C. In some embodiments, an adhesive has a decomposition temperature greater than about 300° C. In some embodiments, an adhesive has a decomposition temperature between about 150° C. and about 350° C. or between about 200° C. and about 300° C.

Moreover, in some embodiments, an adhesive described herein is capable of being applied to a print pad using a dispenser such as a dauber top applicator. In some embodiments, for instance, a dispenser such as a squeezable bottle with an applicator tip may be turned upside down, squeezed, and moved along the top surface of the print pad either prior to placement of the print pad on the 3D printer (in the case of a removable print pad, for example) or while the print pad is on the 3D printer. If desired, the adhesive can be applied using a swirl pattern, stripe pattern, or other pattern.

In some embodiments, an adhesive described herein is a viscous gel at room temperature. The dynamic viscosities of some adhesives described herein were measured in a manner consistent with ASTM D2983. Specifically, the dynamic viscosities were measured using a Brookfield Model DV-E Viscometer and a Brookfield Refrigerated Circulating Bath.

Samples of adhesive (approximately 10 mL) were placed in the viscometer test chamber and maintained at 30° C. using the circulating bath. To determine the dynamic viscosity, a number 15 spindle set to a rotational speed of 50 rpm was used.

In some embodiments, an adhesive described herein has a dynamic viscosity at 30° C. between about 2500 and about 10,000 centipoise (cP) when measured as described herein. In some embodiments, an adhesive has a dynamic viscosity at 30° C. between about 2500 and about 4500 cP, between about 3000 and about 9000 cP, between about 3000 and about 4000 cP, or between about 4500 and about 8000 cP when measured as described herein. In some embodiments, an adhesive has a dynamic viscosity at 30° C. between about 10,000 and about 25,000 cP when measured as described herein. In some embodiments, an adhesive has a dynamic viscosity at 30° C. between about 12,000 and about 20,000 cP, between about 14,000 and about 22,000 cP, or between about 15,000 and about 20,000 cP when measured as described herein.

In some embodiments, the viscosity of an adhesive described herein is selected to provide a desired adhesive layer thickness when the adhesive is applied to a print pad described herein. For example, in some embodiments, an adhesive having a dynamic viscosity greater than about 4000 cP at 30° C. provides a uniform adhesive layer thickness of about 10 µm when applied to a print pad described herein. In some embodiments, an adhesive having a dynamic viscosity between about 7000 and about 10,000 cP at 30° C. can provide a uniform adhesive layer thickness of about 10-12 µm when the adhesive is applied to a textured glass print pad. Moreover, in some embodiments, an adhesive is applied to a print pad in an amount between about 2.5 and about 5 mg/cm$^2$ (where the mass is the adhesive mass and the area is the area of the print pad to which the adhesive is applied).

In addition, in some embodiments, an adhesive described herein does not coagulate during a print process described herein sufficiently to interfere with the print nozzle, even if solvent present in the adhesive evaporates during the print process.

Further, in some embodiments described herein, an adhesive has a high water spread or wetting ability, including on a print pad described herein. In some embodiments, an adhesive spreads water or wets uniformly, including without dewetting. In some embodiments, an adhesive is highly hydrophilic and/or has a high surface energy. The water spread or wetting ability of an adhesive described herein, in some embodiments, can be determined by measuring the diameter of a droplet of deionized water disposed on a layer of the adhesive on the surface of a print pad. In some embodiments, for instance, a water droplet having a volume of about 0.01 mL spreads to a final diameter of about 7-9 mm when disposed on an adhesive described herein disposed on a textured glass print pad. In some embodiments, the diameter of a deionized water droplet on a layer of adhesive described herein disposed on a print pad described herein is at least about 1.5 times the diameter of an equivalent water droplet on the bare surface of the print pad. In some embodiments, the diameter of a deionized water droplet on a layer of adhesive is at least about 3 times or at least about 5 times the diameter of the droplet on the bare print pad. In some embodiments, the diameter of a deionized water droplet on a layer of adhesive is between about 1.5 times and about 3 times, between about 2 times and about 5 times, between about 3 times and about 5 times, or between about 5 times and about 10 times the diameter of the droplet on the bare print pad.

In some embodiments, an adhesive described herein is water soluble. A water-soluble adhesive, for reference purposes herein, has a solubility in water at 25° C. of greater than 10 mass percent, greater than 30 mass percent, greater than 50 mass percent, or greater than 90 mass percent, based on the mass of the adhesive. Moreover, in some embodiments, an adhesive is water soluble before, during, and after being used in a print process, even if some or all of the solvent present in the adhesive evaporates during the print process. In addition, in some embodiments, an adhesive described herein is biodegradable. In some embodiments, an adhesive described herein is safe and non-toxic to humans. Therefore, in some embodiments, an adhesive described herein can be safely dissolved and/or rinsed away from a print pad or finished part, including down the sink and/or into the environment.

Further, an adhesive described herein can have any combination of components and properties described herein not inconsistent with the objectives of the present invention. In some embodiments, for example, an adhesive exhibits both water solubility and hardening upon cooling below its glass transition temperature. In some embodiments, an adhesive exhibits both a high surface energy and increased tackiness in a rubbery state. In some embodiments, an adhesive is a viscous gel that exhibits a water-sensitive and/or temperature-dependent adhesion or bonding strength. In some embodiments, an adhesive is biodegradable, has water spreading properties described herein, has an adhesion or bonding strength or other adhesion property described herein, and has a high heat resistance.

Moreover, the properties of an adhesive described herein can be selected or tuned by altering the relative amounts, chemical identities, and/or molecular weights of the various components of an adhesive described herein. For example, in some embodiments, the adhesion or bonding strength of an adhesive can be selected by altering the relative amounts and chemical identities of the first polymeric component and the second polymeric component. A PVOH described herein, for instance, can be selected as the first polymeric component due to its crystallinity or molecular weight and can be used in a specific amount relative to a second polymeric component to provide a desired amount of adhesiveness or tackiness or water solubility or a desired viscosity. In addition, in some embodiments, the relative amounts of the first and second polymeric components are selected based on a desired temperature-dependent or water-sensitive adhesive property, including in combination with a specific print pad and/or print material described herein. For example, in some embodiments, the amount of a PVOH and/or of a second polymeric component in an adhesive described herein may be altered based on whether an anodized aluminum print pad, textured glass print pad, or polycarbonate print pad is used, and/or whether the print pad is heated or unheated during the print process.

Adhesives described herein can be made in any manner not inconsistent with the objectives of the present invention. For example, in some embodiments, an adhesive is made by combining, stirring, blending, shaking, or mixing the various components of the adhesive described herein, with or without heating. In some embodiments, for instance, an adhesive is made by combining and mixing a first polymeric component described herein (such as a PVOH), a second polymeric component described herein (such as a poly(2-oxazoline), poly(2-ethyl-2-oxazoline, poly(2-ethyl-oxazoline), polyvinyl acetate, polymethyl acrylate, or polylactic acid), and a solvent described herein (such as distilled water). In some embodiments, an adhesive is made by combining and mixing the components of Table II in the amounts indicated, where all listed amounts correspond to weight percents based on the total weight of the adhesive. Moreover, an adhesive described herein can be made manually or by machine, including in an automated process.

TABLE II

| Adhesive | PVOH | Second Polymeric Component | DI Water | Surfactant | Preservative |
|---|---|---|---|---|---|
| 1 | 2-50 | 2-50 | 50-95 | 0.01-1 | 0.01-1 |
| 2 | 5-50 | 2-50 | 50-95 | — | — |
| 3 | 3-10 | 30-50 | 50-95 | 0.01-0.05 | 0.01-0.05 |
| 4 | 3-10 | 30-50 | 50-95 | — | — |
| 5 | 20-40 | 5-15 | 50-95 | 0.01-0.05 | 0.01-0.05 |
| 6 | 20-40 | 10-30 | 50-95 | — | — |
| 7 | — | 5-60 | 50-95 | 0.0-0.05 | 0.0-0.05 |
| 8 | — | 30-50 | 50-95 | 0.01-1 | 0.01-1 |

In some embodiments, the PVOH comprises amorphous PVOH, and the second polymeric component does not comprise PVOH. In some embodiments, the second polymeric component comprises poly(2-oxazoline), poly(2-ethyl-2-oxazoline), or poly(2-ethyl-oxazoline).

II. Methods of Printing a 3D Article

In another aspect, methods of printing a 3D article or object are described herein. In some embodiments, a method of printing a 3D article comprises applying an adhesive to a build surface of a print pad of a 3D printer, such as a Cube® 3D Printer manufactured by 3D Systems of Rock Hill, S.C. The adhesive can comprise any adhesive described hereinabove in Section I. For example, in some embodiments, the adhesive comprises a first polymeric component comprising a polyvinyl alcohol) and a second polymeric component. In some embodiments, the first polymeric component and the second component are not the same material but are instead separate components of the adhesive. In addition, the adhesive can be applied to the build surface of the print pad in such a manner as to provide a layer of adhesive. The layer can be continuous or discontinuous and, in some embodiments, can be substantially uniform, where a "substantially uniform" layer exhibits a thickness that varies by less than about 10 percent or less than about 5 percent. Moreover, the layer of adhesive can also exhibit any other feature or property of a layer of adhesive described hereinabove in Section I. Thus, as described herein, the present invention also provides a print pad comprising a layer of adhesive disposed on a build surface of the print pad. The print pad can comprise any print pad described hereinabove in Section I, such as an aluminum print pad, glass print pad, or polycarbonate print pad of a 3D printer.

In some embodiments, a method described herein further comprises selectively depositing layers of a fluid ink or print material onto the build surface of the print pad to form the 3D article. The print material can comprise any print material described herein. In some embodiments, the layers of the print material are deposited according to an image of the 3D article in a computer readable format. In some embodiments, the print material is deposited according to preselected computer aided design (CAD) parameters.

Moreover, in some embodiments described herein, the print material exhibits a phase change upon deposition and/or solidifies upon deposition. In some embodiments, the temperature of the printing environment can be controlled so that the jetted droplets of print material solidify on contact with the receiving surface.

In some embodiments, a method of printing a 3D article further comprises supporting at least one of the layers of the print material with a support material, including a support material described herein. A support material, in some embodiments, can be deposited in a manner consistent with that described herein for the print material. The support material, for example, can be deposited according to the preselected CAD parameters such that the support material is adjacent or continuous with one or more layers of the print material. Jetted droplets of the support material, in some embodiments, solidify or freeze on contact with the receiving surface.

Layered deposition of the print material and support material can be repeated until the 3D article has been formed.

In some embodiments, a method described herein further comprises removing the printed 3D article from the print pad. Moreover, in some embodiments, removing the 3D article from the print pad comprises altering an adhesive property of the adhesive, including in a manner described hereinabove in Section I. For example, in some embodiments, the adhesion strength or bonding strength of the adhesive with the print pad or 3D article is altered by changing the temperature of the adhesive or exposing the adhesive to water. In some embodiments, the adhesion strength or bonding strength of the adhesive is reduced by reducing the temperature or exposing the adhesive to water. In some embodiments, the adhesion strength or bonding strength of the adhesive is reduced by submerging the print pad and printed 3D article in water. In some embodiments, the water is warm water, such as water at a temperature between about 45° C. and about 90° C., between about 50° C. and about 85° C., or between about 55° C. and about 70° C.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed:

1. A method of printing a 3D article comprising:
   applying an adhesive to a build surface of a print pad of a 3D printer to provide a layer of the adhesive on the build surface of the print pad, the adhesive comprising:
      a first polymeric component comprising one or more of a methyl vinyl ether/maleic anhydride co-polymer, a poly(2-oxazoline), poly(2-ethyl-2-oxazoline), poly (2-ethyl-oxazoline), and polymethyl acrylate; and
      a solvent,
   wherein the first polymeric component is present in the adhesive in an amount between 5 and 50 weight percent, based on the total weight of the adhesive, and
   wherein the adhesive is applied to the build surface of the print pad prior to beginning a print process.

2. The method of claim 1 further comprising:
   selectively depositing layers of a fluid print material onto the build surface of the print pad to form the 3D article; and
   removing the 3D article from the print pad,
   wherein removing the 3D article from the print pad comprises altering the adhesive property of the adhesive.

3. The method of claim 1, wherein the build surface of the print pad comprises an anodized aluminum surface, a glass surface, or a polycarbonate surface.

4. The method of claim 1, wherein the first polymeric component is a methyl vinyl ether/maleic anhydride copolymer.

5. The method of claim 1, wherein the first polymeric component is a poly(2-oxazoline), poly(2-ethyl-2-oxazoline), or poly(2-ethyl-oxazoline).

6. The method of claim 1, wherein the first polymeric component is polymethyl acrylate.

7. The method of claim 1, wherein the adhesive further comprises a second polymeric component.

8. The method of claim 7, wherein the second polymeric component comprises an amorphous poly(vinyl alcohol).

9. The method of claim 1, wherein the solvent comprises deionized water.

10. The method of claim 1, wherein the solvent comprises one or more of acetone, ethanol, methanol, ethylene glycol, propylene glycol, triethylene glycol, glycerin, acetamide, dimethyl acetamide, dimethyl sulfoxide, methyl ethyl ketone, methylene chloride, and combinations or mixtures thereof.

11. The method of claim 1, wherein the adhesive further comprises a surfactant.

12. The method of claim 1, wherein the adhesive further comprises a preservative.

13. The method of claim 2, wherein altering the adhesive property of the adhesive comprises changing the temperature of the adhesive.

14. The method of claim 2, wherein altering the adhesive property of the adhesive comprises exposing the adhesive to water.

15. A method of printing a 3D article comprising:
applying an adhesive to a build surface of a print pad of a 3D printer to provide a layer of the adhesive on the build surface of the print pad, the adhesive comprising:
a first polymeric component comprising an amorphous poly(vinyl alcohol); and
a second polymeric component,
wherein the adhesive is applied to the build surface of the print pad prior to beginning a print process.

16. The method of claim 15, wherein the poly(vinyl alcohol) is present in the adhesive in an amount between 3 and 20 weight percent, based on the total weight of the adhesive, and the second polymeric component is present in the adhesive in an amount between 30 and 50 weight percent, based on the total weight of the adhesive.

17. The method of claim 15, wherein the poly(vinyl alcohol) is present in the adhesive in an amount between 3 and 10 weight percent, based on the total weight of the adhesive.

18. The method of claim 15, wherein the adhesive further comprises a solvent, a surfactant, and a preservative, and wherein the solvent is present in the adhesive in an amount between 50 and 95 weight percent, the surfactant is present in the adhesive in an amount between 0.01 and 0.5 weight percent, and the preservative is present in the adhesive in an amount between 0.01 and 0.5 weight percent, based on the total weight of the adhesive.

19. The method of claim 15, wherein the adhesive has a bonding strength that is at least 10 times greater at 100° C. than at room temperature or a bonding strength that is at least 10 times greater when dry at 23° C. than when wet at 23° C.

20. The method of claim 15, wherein the adhesive has a glass transition temperature below 100° C.

* * * * *